United States Patent

Malito et al.

(10) Patent No.: US 7,955,589 B2
(45) Date of Patent: Jun. 7, 2011

(54) COMPOSITION AND METHOD FOR IMPROVED ALUMINUM HYDROXIDE PRODUCTION

(75) Inventors: John T. Malito, Oswego, IL (US);
James A. Counter, Thirroul New South Wales (AU)

(73) Assignee: Nalco Company, Naperville, IL (US)

( * ) Notice: Subject to any disclaimer, the term of this patent is extended or adjusted under 35 U.S.C. 154(b) by 499 days.

(21) Appl. No.: 11/159,467

(22) Filed: Jun. 23, 2005

(65) Prior Publication Data

US 2006/0292050 A1 Dec. 28, 2006

(51) Int. Cl.
*C01F 7/34* (2006.01)
(52) U.S. Cl. .................. 423/629; 423/111; 423/127
(58) Field of Classification Search .............. 423/629, 423/111, 119, 120, 121, 122, 127
See application file for complete search history.

(56) References Cited

U.S. PATENT DOCUMENTS

| | | | |
|---|---|---|---|
| 4,737,352 A | 4/1988 | Owen et al. |
| 5,312,603 A | 5/1994 | Hachgenei et al. |
| 5,607,598 A | 3/1997 | Williams |
| 6,168,767 B1 | 1/2001 | Welton et al. |
| 6,293,973 B1 | 9/2001 | Farquharson et al. |
| 6,599,489 B2 | 7/2003 | Mahoney et al. |

*Primary Examiner* — Stanley Silverman
*Assistant Examiner* — James A Fiorito
(74) *Attorney, Agent, or Firm* — Joshua D. Bishop; Michael B. Martin

(57) ABSTRACT

An improved method and composition for producing aluminum hydroxide crystals in a Bayer process pregnant liquor, involve the addition of a crystallization modifier comprising a $C_8$-$C_{10}$ fatty acid, precursors, salts or blends thereof. The alkyl chain of the fatty acid crystallization modifier is free of functional groups. The modifier yields a commercially in the presence and absence of an hydrocarbon oil which dissolves the fatty acid.

13 Claims, No Drawings

COMPOSITION AND METHOD FOR IMPROVED ALUMINUM HYDROXIDE PRODUCTION

FIELD OF THE INVENTION

The present invention relates to improved aluminum hydroxide crystal production from the Bayer Process. In particular, the invention relates to compositions and methods for increasing particle size of aluminum hydroxide crystals without decreased yield.

BACKGROUND OF THE INVENTION

Aluminum hydroxide (also known as alumina trihydrate) is used to produce primary aluminum metal using electrolytic reduction processes. Aluminum hydroxide is produced on an industrial scale by a well-established procedure known as the Bayer Process. In this process, the steps involving crystallization and precipitation of solubilized aluminum hydroxide values from process liquors, are critical relative to the economic recovery of aluminum values. Economic recovery is realized by optimization of two commercially significant parameters: yield and average particle size.

Efforts to increase the yield and particle size of the aluminum hydroxide recovered from Bayer process liquor have failed to provide optimization of a commercially significant product. With the steep rise in energy costs during the past few years, aluminum hydroxide processing operators continue to seek optimal parameters for producing a commercially-acceptable aluminum hydroxide product. Despite efforts to identify chemical additives and methods to reduce the number of undersized alumina particles while maintaining process efficiency, none have been entirely successful in increasing yield and particle size of the alumina recovered in Bayer process liquors. The products of these efforts include filter aids such as coagulants or flocculants optionally containing polyacrylic acids (PAA), crystallization modifiers, and dewatering agents. For example, U.S. Pat. No. 4,737,352 (hereinafter the '352 patent) assigned to Nalco discloses a method providing a reduced percent of small size crystals and an increase in the yield of coarser aluminum hydroxide crystals by adding a blend of surfactant dispersed in oil to the pregnant liquor during the precipitation phase of the process. The claims in the patent limited the surfactant to a tall fatty acid. The specification of the '352 patent, however, disclosed the surfactant as any fatty acid having at least a saturated or unsaturated four carbon alkyl backbone optionally containing at least one functional group. Additionally, the specification discloses a functionalized $C_8$ alkyl fatty acid as advantageous; the fatty acid was not claimed and the advantages of this fatty acid is not disclosed or taught by actual or constructive reduction to practice. The specification defines the improved method as treating hot caustic Bayer process green liquor with a surfactant/oil blend. The specification does not teach, describe, or remotely suggest that the length of the carbon chain of the fatty acid is a factor imparting novelty. Two commercial crystal growth modifiers having fatty acid chains of greater than ten carbons were commercialized and are referred to as Commercial Product 1 and Commercial Product 2 in examples exemplifying the inventive step of teaching fatty acid chain length in improved aluminum hydroxide production. The '352 parent discloses a genus of fatty acids in oil that result in an improved commercial product. As described in the examples, the fatty acid composition described herein describes a fatty acid species imparting unexpected results from those described in the genus patent.

The limitations of yield and particle size of alumina recovered from Bayer process liquors is also disclosed in U.S. Pat. No. 6,168,767 (hereinafter the '767 patent) entitled "Production of Alumina" assigned to Ciba Specialty Chemicals Water Treatments Limited. A water-soluble crystallization modifier formulation comprising: a first composition of a polyalkoxylated non-ionic surfactant; and a second composition comprising a surfactant, or a precursor thereof, which is not polyalkoxylated presumably presents increased crystal size without decreased yield. Ethylene oxide (EO) units are identified as essential component of the formulation in the polyalkoxylated non-ionic surfactant, preferably, ethylene oxide and propylene oxide (PO) units form an ethylene oxide-propylene oxide block copolymer. The cost effectiveness of these components and their acceptance when compared to the surfactant/oil blends used in the majority of crystallization modifier formulations in most Bayer processing plants today remains questionable.

Despite efforts to satisfy the demands made by continuous and ongoing development of the Bayer process worldwide, the industry needs for an improved alumina product remain unfulfilled.

SUMMARY OF THE INVENTION

To satisfy the long-felt but unsolved needs identified above, a method and composition for obtaining aluminum hydroxide crystals with increased particle size and yield in the Bayer process have been developed. This result is realized by the addition of $C_8$-$C_{10}$ fatty acids, precursors, salts or blends thereof, said fatty acid carbon backbone free of functional groups. Depending on the parameters of the processing system, the C8-10 crystallization modifier is dosed neat or dissolved in an oil carrier.

Thus a composition described and taught herein includes as an active ingredient a surfactant fatty acid, precursor, salt or blends thereof having an alkyl chain length of $C_8$ to $C_{10}$ saturated or unsaturated, branched or unbranched carbon atoms, said carbon atoms free of functional groups dissolved in an oil with a boiling point above about 200° F. This fatty acid/oil blend is dosed in the Bayer process liquor according to the method described herein.

A second composition described and taught includes as an active ingredient a surfactant fatty acid, precursor, salt or blends thereof having an alkyl chain length of $C_8$ to $C_{10}$ saturated or unsaturated, branched or unbranched carbon atoms, said carbon atoms free of functional groups. This fatty acid is dosed neat into the liquor according to the method described herein.

The appropriate crystallization modifier composition is incorporated into the method in an amount effective to shift in the particle size distribution of aluminum hydroxide crystals so that the resulting crystals have a reduced formation of product fines without substantial reduction in the overall product yield of aluminum hydroxide.

DETAILED DESCRIPTION OF THE INVENTION

Definitions

As used herein, the terms identified below are defined as:
About: is equal to or within 2 integers of a specified number.
Commercial Product 1 and Commercial Product 2: commercialized crystal growth modifiers having fatty acid chains of greater than ten carbons as described in the '352 patent were and are referred to as Commercial Product 1 and 2.
Crystallization modifier composition: The list, description and designated proportions of raw materials used to make the said additive comprising a C8-10 fatty acid.
Fatty acid having an alkyl chain length of $C_8$-$C_{10}$ carbon atoms: is the product C-810 available from Proctor and Gamble. It is a yellow liquid with average molecular weight of 154 g/mol and approximate composition of the following fatty acid chain lengths: $C_6$<6%, $C_8$53-60%, $C_{10}$34-42% and $C_{12}$<2%. The carbon chain may be saturated or unsaturated, branched or unbranched and is free on functional groups.

Paraffinic oil: Comprises a generally straight, saturated or unsaturated hydrocarbon chains. Some cyclic hydrocarbons are also contained in the Escaid 110 oil and are also classed as paraffinic.

Weight percent ratio: The total weight fraction of one reagent within 100 grams of the composition or mixture. The corresponding fraction of the other component is the latter subtracted from 100.

Free of functional group attachments: Any alkyl chain of any length with hydrogen and carbon being the only atoms comprising that chain.

Heated Bayer process liquor: Any liquor within the Bayer process having a free alkalinity level above 100 g/L of $Na_2CO_3$ and a temperature above ambient or 25° C.

Spent Liquor: describes the liquor after the final classification stage which returns back to digestion in the Bayer process.

% Increase over control quantile particle size: The particle size distribution is conveniently given by the three quantiles, d(0.1), d(0.5) and d(0.9). Thus, 10%, 50% and 90%, respectively, of the total particle volume (or mass) is less than the size given in the tables. The % increase over the control quantile particle size is the difference between the additive dosed and control for the respective quantile particle size divided by the control quantile particle size.

Effective amount: An effective amount is deemed any dosage of any additive that affords an increase in one or all three quantiles when compared to an undosed control sample.

Increased product yield: A greater aluminum hydroxide solid content within the precipitating vessel at the end of the precipitation run is achieved. This is generally indicated by a lower liquor aluminum hydroxide concentration for the corresponding vessel.

The Fatty Acid/Oil Characterization

An exemplified $C_8$-$C_{10}$ fatty acid is the product C-810 available from Proctor and Gamble at a concentration of 150 g/L dispersed in a commercially available paraffinic hydrocarbon oil ESCAID 110. As described in U.S. Pat. No. 4,737, 352 to Nalco, wherein generic tall oil fatty acid/oil formulations were first disclosed, the invention in practice is unaffected by different proprietary precipitation techniques involving proprietary process parameters. This is great significant because it establishes that regardless of the proprietary processing parameters maintained inside the precipitating tank, the present invention for actual practice only requires blending and in-line injection of a one-constituent or two-constituent solution which composes the treatment. These constituents are (A) a $C_8$-$C_{10}$ fatty acid which will not degrade to anything less than a tall oil equivalent in the presence of a hot (up to 180°-190° F.) strong caustic solution (e.g., 200 g/l alkalinity) together with (B) an oil carrier for the fatty acid. The oil need only be a solvent for the surfactant and have a boiling point safely above the temperature of the hot Bayer green liquor undergoing precipitation. Advantageously the fatty acid may contain at least an eight carbon backbone free of any functional groups usually modifying such compounds.

Since the $C_8$-$C_{10}$ are oil soluble, the only limitation on which oil to choose is one with a boiling point above about 200° F. The oil carrier may be one selected from the paraffinic series, it may be an aromatic oil (e.g. naphthenic oil) or it may be any mixture of these.

A solution of $C_8$-$C_{10}$ unmodified fatty acid in a low aromatic or paraffinic oil as the oil carrier, in the weight proportion of about 15:85, the dosage being about 1 to 50 ppm.

The Processing Liquor

The examples employ a pregnant liquor (charge) for aluminum hydroxide precipitation, which is the hot caustic solution obtained after elimination of the red mud in the Bayer process. An understanding of the entire Bayer Process is unnecessary to understanding the inventive concept: a $C_8$-$C_{10}$ fatty acid in the presence or absence of oil. The green liquor, after red mud separation, is a hot, caustic filtrate, the commercial production green liquor containing the aluminum values as dissolved sodium aluminate. This liquor and recirculated fine particle alumina trihydrate seeds are charged into a suitable precipitating tank or a series of connecting tanks. Here, the charge is cooled under agitation to stress the contents, causing precipitation of aluminum hydroxide crystals on the seeds, which constitute growth sites.

Complete elimination of the fine particle material (e.g. −325 mesh or smaller) is not wanted. There needs to be a remnant source of seeds, following precipitation, for recirculation to serve the next generation of repeated growth in a continuous process.

In brief, the precipitation process involves nucleation followed by (a) initial crystal growth and (b) agglomeration of those crystals into a coarse or sand-like aluminum hydroxide particle which will later be dried, and often calcined to obtain $Al_2O_3$ as the commercial product of value.

The examples below demonstrate the improved commercial product obtained by employing the methods and compositions taught and described. The standard pretreatments, comparative pretreatments and testing used in the assessment of the efficacy of the C8-10 fatty acid are as follows:

Precipitation Tests: Liquor Preparation

Each set of tests was run using fresh pregnant liquor, obtained from the reconstitution of plant spent liquor. Spent liquor is the term used in the Bayer process to describe the liquor after the final classification stage which returns back to digestion. A desired weight of spent liquor was measured into a stainless steel beaker and the volume was reduced by evaporation to about 30%. To this a set weight of Aluminum hydroxide solid was added and the mixture stirred until it was dissolved. This solution was removed from the hot-plate and placed on a weighing balance and de-ionized water added until a desired weight was attained. The pregnant liquor was filtered to remove any insoluble material.

Final liquor composition comprised:
A (aluminium hydroxide)=150±10 g/L of $Al_2O_3$
C (total caustic or free alkalinity)=230±10 g/L of $Na_2CO_3$
S (soda, total alkali, total alkalinity)=260±10 g/L of $Na_2CO_3$
such that A/C=0.66±0.05

Precipitation Tests: Additive Evaluation

All precipitation tests were performed in 250-mL Nalgene® bottles rotated end-over-end, at 10 rpm, in an Intronics temperature-controlled water bath. The pregnant liquor having a density of 1.30 kg/L (~72° C.) was placed into the bottles by weight (200 mL=260.0 g), for improved precision. The additive was dosed, with respect to the total surface area of the seed crystals (mg/m$^2$), to the lid of the appropriate bottles using a micro-syringe and the bottles were then placed in the rotating bath for equilibration at 72° C. (20 minutes). After equilibration, the bottles were removed, quickly charged with the required quantity of seed (50 g/L, based on liquor volume) and immediately returned to the water bath. The temperature of the water bath was set to 72° C. The bottles were rotated overnight for 15 hours.

On completion of the 15 hours, the bottles were removed and for each bottle a 20-mL sample of the slurry was filtered through a syringe filter and submitted for liquor analysis. To prevent any further precipitation, 10 mL of a sodium gluconate solution (400 g/L) was added to the remaining slurry and mixed well. The solids were collected by vacuum filtration and were thoroughly washed with hot deionized water and dried at 110° C. The particle size distribution and specific surface area were determined on a Malvern Particle Sizer, which is well known in the art. The particle size distribution is conveniently given by three quantiles, d(0.1), d(0.5) and d(0.9). These represent the particle size at which the total particle volume (or mass) is less than about 10%, 50% and 90% respectively.

Samples were evaluated by comparing (1) an undosed control sample; (2) samples dosed with Commercial Product 1 and Commercial product 2; and (3) samples dosed with neat C8-10 and C8-10/oil blend.

Compositions:

Product A being a $C_8$-$C_{10}$ a commercially available fatty acid from Proctor and Gamble termed C-810. Concentration is 150 g/L in a commercially available paraffinic hydrocarbon oil termed Escaid 110.

Product B being a $C_{12}$-$C_{16}$ lauric acid sample from Aldrich chemicals. Concentration is 150 g/L in a commercially available paraffinic hydrocarbon oil termed Escaid 110.

Product C being a $C_{16}$-$C_{18}$ oleic fatty acid sample from Aldrich chemicals. Concentration is 150 g/L in a commercially available paraffinic hydrocarbon oil termed Escaid 110.

| Example | Dose (mg/m$^2$) | Quantile Particle Size, μm | | | % Increase Over Control Quantile Particle Size | | |
|---|---|---|---|---|---|---|---|
| | | d(0.1) | d(0.5) | D(0.9) | D(0.1) | D(0.5) | d(0.9) |
| Control 1 | — | 47 | 77 | 125 | | | |
| Control 2 | — | 47 | 78 | 128 | | | |
| Control 3 | — | 45 | 74 | 121 | | | |
| Average | | 46 | 76 | 126 | | | |
| Commercial Product 1 | 2 | 52 | 86 | 142 | 13 | 13 | 13 |
| Commercial Product 1 | 4 | 54 | 90 | 147 | 17 | 18 | 17 |
| Commercial Product 2 | 2 | 49 | 84 | 141 | 7 | 11 | 11 |
| Commercial Product 2 | 4 | 53 | 86 | 137 | 15 | 13 | 9 |
| Product A | 2 | 57 | 92 | 147 | 24 | 21 | 17 |
| Product A | 4 | 55 | 92 | 150 | 20 | 21 | 19 |
| Product B | 2 | 44 | 76 | 127 | −4 | 0 | 1 |
| Product B | 4 | 42 | 71 | 119 | −9 | −7 | −6 |
| Product C | 2 | 49 | 80 | 129 | 7 | 5 | 2 |
| Product C | 4 | 44 | 74 | 117 | −4 | −3 | −7 |

TABLE 2

EFFECTS OF FATTY ACIDS ON PARTICLE SIZE OF BAYER ALUMINUM HYDROXIDE AT 65° C. RESULTS COMPARED WITH COMMERCIAL PRODUCT 1.

| Example | Dose (mg/m$^2$) | Quantile Particle Size, μm | | | % Increase Over Control Quantil Particle Size | | |
|---|---|---|---|---|---|---|---|
| | | d(0.1) | d(0.5) | d(0.9) | D(0.1) | D(0.5) | d(0.9) |
| Control 1 | — | 45 | 74 | 120 | | | |
| Control 2 | — | 46 | 76 | 124 | | | |
| Average | | 46 | 75 | 122 | | | |
| Commercial Product 1 | 2 | 52 | 84 | 134 | 14 | 12 | 10 |
| Commercial Product 1 | 4 | 55 | 87 | 138 | 10 | 16 | 13 |
| Product A | 2 | 57 | 93 | 153 | 25 | 24 | 25 |
| Product A | 4 | 54 | 90 | 148 | 19 | 20 | 21 |
| Product C | 2 | 44 | 75 | 122 | −3 | 0 | 0 |
| Product C | 4 | 39 | 68 | 106 | −14 | −9 | −13 |

The efficacy of the C8 to C10 carbon chain length was confirmed by test methods described above except that the fatty acid was dosed neat into the liquor and compared to control (no additive) and Commercial product 1. Neat C8-C10 exhibited improved performance over control on particle size of aluminum hydroxide compared over the to the control at 72 degrees C.

Although the invention has been described in detail in the foregoing for the purpose of illustration, it is to be understood that such detail is solely for that purpose and that variations can be made therein by those skilled in the art without departing from the spirit and scope of the invention except as except as it may be limited by the claims."

What is claimed is:

1. A process for recovering aluminum hydroxide crystals from a pregnant Bayer process liquor by adding a crystallization modifier to the liquor, wherein the crystallization modifier comprises a C8 to C10 fatty acid, precursor, salt or blends thereof, said fatty acid carbon backbone free of functional groups; and, wherein the crystallization modifier is dissolved in an oil carrier and wherein the crystallization modifier is saturated and unbranched; and
    wherein the crystallization modifier excludes polyalkoxylated non-ionic surfactant.

2. The process of claim 1, wherein the oil carrier has a boiling point above about 200° F.

3. A process for recovering aluminum hydroxide crystals from a pregnant Bayer process liquor by adding a crystallization modifier to the liquor, wherein the crystallization modifier includes:

a surfactant fatty acid, precursor, salt or blends thereof, said fatty acid having an alkyl chain length of C8 to C10 carbon atoms, said carbon atoms free of functional groups dissolved in an oil, the oil having a boiling point above about 200° F. and wherein the crystallization modifier is saturated and unbranched; and wherein the crystallization modifier excludes polyalkoxylated non-ionic surfactant.

4. A process for recovering aluminum hydroxide crystals from a pregnant Bayer process liquor by adding a crystallization modifier consisting essentially of a C8 to C10 fatty acid additive dosed neat into the liquor, wherein the fatty acid is free of functional groups and wherein the crystallization modifier is saturated and unbranched; and wherein the crystallization modifier excludes polyalkoxylated non-ionic surfactant.

5. A process for recovering aluminum hydroxide crystals from a pregnant Bayer process liquor by adding a crystallization modifier to the liquor, wherein the crystallization modifier comprises:

(a) a surfactant fatty acid, precursor, salt or blends thereof, said fatty acid having an alkyl chain length of C8 to C10 carbon atoms, said carbon atoms free of functional groups and wherein the crystallization modifier is saturated and unbranched; and (b) an oil with a boiling point above about 200° F. in which the fatty acid of (a) is dissolved;

wherein the crystallization modifier excludes polyalkoxylated non-ionic surfactant.

6. The process of claim 1, in which the crystallization modifier is a composition comprising:

(a) an alkaline solution;

(b) a fatty acid, fatty acid precursor, salt or blends thereof having an alkyl chain length of C8-C10 carbon atoms, with the proviso that the fatty acid component backbone is free of functional groups; and (c) a hydrocarbon oil in which the fatty acid in (b) is dissolved;

wherein the crystallization modifier excludes polyalkoxylated non-ionic surfactant.

7. The process of claim 6, wherein the ratio of fatty acid of (b) dissolved in the hydrocarbon oil (c) has a weight proportion of about 15:85.

8. An improved process for the production of aluminum hydroxide from a Bayer process liquor containing an aqueous phase of sodium aluminate, the liquor produced by separation of caustic-insoluble suspended solids, the improvement comprising addition of a crystallization modifier to the liquor, wherein said crystallization modifier is a surfactant fatty acid, precursor, salt or blends thereof, said fatty acid having an alkyl chain length of C8 to C10 carbon atoms, said carbon atoms free of functional groups dissolved in an oil with a boiling point above about 200° F. and wherein the crystallization modifier is saturated and unbranched;

wherein the crystallization modifier is added in an amount effective to shift in the particle size distribution of aluminum hydroxide crystals so that the resulting crystals have a reduced formation of product fines relative to when the crystallization modifier is not added; and wherein the crystallization modifier excludes polyalkoxylated non-ionic surfactant.

9. An improved crystallization modifier composition for the production of aluminum hydroxide by the Bayer process, wherein the crystallization modifier comprises:

a surfactant fatty acid, precursor, salt or blends thereof, said fatty acid having an alkyl chain length of C8 to C10 carbon atoms, said carbon atoms free of functional groups, the fatty acid dissolved in an oil with a boiling point above about 200° F. and wherein the crystallization modifier is saturated and unbranched;

wherein the crystallization modifier is added in an amount effective to provide an upward shift in the particle size distribution of aluminum hydroxide, without substantial reduction in the overall product yield; and wherein the crystallization modifier excludes polyalkoxylated non-ionic surfactant.

10. A Bayer process for producing aluminum hydroxide crystals having a reduced formation of product fines concurrent with an upward shift in the particle size distribution of aluminum hydroxide, without substantial reduction in the overall product yield of aluminum hydroxide, wherein the process incorporates the addition of the improved crystallization composition of claim 9 to a Bayer process.

11. Aluminum hydroxide crystals produced with an improved Bayer process having a reduced formation of product fines concurrent with an upward shift in the particle size distribution of aluminum hydroxide, without substantial reduction in the overall product yield produced by the process of claim 1, wherein said process includes the addition of the crystallization modifier of claim 1.

12. A process for recovering aluminum hydroxide crystals from a pregnant Bayer process liquor by adding a crystallization modifier to the liquor, wherein the crystallization modifier comprises a C8 to C10 fatty acid, precursor, salt or blends thereof, said fatty acid carbon backbone free of functional groups;

wherein the crystallization modifier is dissolved in an oil carrier;

wherein the crystallization modifier is saturated and unbranched; and wherein the oil carrier is selected from the group consisting of a paraffinic oil, an aromatic oil; and wherein the crystallization modifier excludes polyalkoxylated non-ionic surfactant, and a mixture comprising at least one paraffinic oil and at least one aromatic oil.

13. A process for recovering aluminum hydroxide crystals from a pregnant Bayer process liquor by adding a crystallization modifier to the liquor, wherein the crystallization modifier consists essentially of a C8 to C10 fatty acid, precursor, salt or blends thereof, and an oil carrier; the fatty acid carbon backbone free of functional groups; and wherein the crystallization modifier excludes polyalkoxylated non-ionic surfactant.

* * * * *